(12) United States Patent
Ou et al.

(10) Patent No.: US 8,302,115 B2
(45) Date of Patent: Oct. 30, 2012

(54) SLIM OPTICAL DISK DRIVE CAPABLE OF REDUCING NOISE OF SIGNALS

(75) Inventors: Hsien-Chung Ou, Taoyuan County (TW); Li-Li Yang, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 176 days.

(21) Appl. No.: 12/884,218

(22) Filed: Sep. 17, 2010

(65) Prior Publication Data
US 2012/0072928 A1 Mar. 22, 2012

(51) Int. Cl.
*G11B 33/14* (2006.01)
*G11B 17/03* (2006.01)

(52) U.S. Cl. ........ 720/650; 720/652
(58) Field of Classification Search ........ 174/102 SP; 361/800, 816, 818; 720/600, 601, 613, 648, 720/650, 652–654
See application file for complete search history.

(56) References Cited

U.S. PATENT DOCUMENTS
6,225,568 B1 * 5/2001 Lin et al. ........ 174/250
7,577,967 B2 * 8/2009 Li et al. ........ 720/650
* cited by examiner

*Primary Examiner* — Nathan Danielsen
(74) *Attorney, Agent, or Firm* — Winston Hsu; Scott Margo

(57) ABSTRACT

A slim optical disk drive includes a lower housing, a tray, a protection plate, a flexible cable and an isolated part. The tray is supported by two slide rails for sliding in or sliding out of an opening of the lower housing. The protection plate is for covering a bottom of the tray. The flexible cable includes a plurality of wires. The flexible cable extends toward the opening and is stuck on the lower housing. A curved area is formed by bending the flexible cable near the opening. The flexible cable is accommodated between the protection plate and the lower housing when the tray is slid inside the lower housing. The isolated part is disposed on the protection plate. The isolated part is for shielding predetermined wires of the plurality of the wires to reduce noise of signals.

5 Claims, 6 Drawing Sheets

SLIM OPTICAL DISK DRIVE CAPABLE OF REDUCING NOISE OF SIGNALS

BACKGROUND OF THE INVENTION

1. Field of the Invention

The present invention relates to an optical disk drive, and more specifically, to a slim optical disk drive utilizing a tray to carry a disc to slide in or slide out of an opening, so as to change the disc for reading or writing.

2. Description of the Prior Art

A flexible printed circuit (FPC) or a flexible flat circuit (FFC) is used in a slim optical disk drive to electrically connect a main board and electronic components on a tray for transmitting data or supplying power.

As shown in FIG. 1, FIG. 1 is a cross-sectional diagram of a conventional slim optical disk drive 1. A main board 3 is disposed on a rear end of a lower housing 2. Two slide rails (not shown) are respectively disposed on two sides of the lower housing 2. Two slide rails support a tray 5 carrying a disc 4 to slide in or slide out of the slim optical disk drive 1. A spindle motor 6 is disposed on the tray 5 to rotate the disc 4. An optical pick-up head 7 is disposed on the tray 5 to read data from the disc 4 and to write data in the disc 4. A flexible cable 8 is connected to a rear end of the tray 5. Another end of the flexible cable 8 is connected to the main board 3. The main board 3 transmits power and signals via the flexible cable 8 to control the spindle motor 6 to rotate the disc 4 or to drive the optical pick-up head 7 to read data from the rotating disc 4. Afterward, data is transmitted to main board 3 to be processed. A metal protection plate 9 is covered on a bottom of the tray 5 to protect precise components on the tray 5 from electromagnetic interference and being touched by a user when the precise components are slid out of the slim optical disk drive 1.

An end of the flexible cable 8 is connected to the main board 3. The flexible cable 8 extends toward an opening 10 and is stuck on the lower housing 2. A curved area 11 is formed by bending the flexible cable 8 near the opening 10. The other end of the flexible cable 8 is connected to a rear side of the tray 5 in a floating manner. The flexible cable 8 is accommodated between the protection plate 9 and the lower housing 2 when the tray 5 is slid inside the lower housing 2 with carrying the disc 4.

However, in order to meet the trend of slim and light, the thickness of the slim optical disk drive 1 is decreased. Therefore, the protection plate 9 and the lower housing 2 get close to each other and squeeze the flexible cable 8 in a limited space, so as to increase noise of signals in the flexible cable 8 and make the slim optical disk drive 1 unsteady. Hence, there are still problems needed to be solved in the conventional slim optical disk drive 1 in data transmission of the flexible cable 8.

SUMMARY OF THE INVENTION

An objective of the present invention is to provide a slim optical disk drive utilizing an isolated part on a flexible cable to reduce effect of capacity between a protection plate and a lower housing, so as to avoid noise of signals in the flexible cable.

The present invention provides a slim optical disk drive including a lower housing. Two slide rails are respectively disposed on two sides of the lower housing, and a connector is disposed on a rear side of the lower housing. The slim optical disk drive further includes a tray supported by the two slide rails for sliding in or sliding out of an opening of the lower housing, a protection plate for covering a bottom of the tray, and a flexible cable including a plurality of wires. An end of the flexible cable is connected to the connector. The flexible cable extends toward the opening and is stuck on the lower housing. A curved area is formed by bending the flexible cable near the opening. The other end of the flexible cable is connected to a rear side of the tray in a floating manner. The flexible cable is accommodated between the protection plate and the lower housing when the tray is slid inside the lower housing to read or write a disc. The slim optical disk drive further includes an isolated part disposed on the protection plate, and the isolated part is located above the curved area of the flexible cable for shielding predetermined wires of the plurality of the wires to reduce noise of signals.

Another objective of the present invention is to provide a slim optical disk drive comprising a through hole in a protection plate, and the through hole is located above a curved area of a flexible cable to reduce effect of capacity, so as to reduce interference to signals transmitted in the flexible cable.

Another objective of the present invention is to provide a slim optical disk drive comprising a through hole in a protection plate, and the through hole is located above a curved area of a flexible cable for shielding predetermined wires with weak signals to reduce effect of capacity, so as to reduce interference to signals transmitted in the flexible cable.

Another objective of the present invention is to provide a slim optical disk drive comprising rows of through holes in a protection plate with different widths, and the rows of through holes are located above a curved area of a flexible cable for shielding predetermined wires with weak signals to reduce effect of capacity and protect components, so as to reduce interference to signals transmitted in the flexible cable.

Another objective of the present invention is to provide a slim optical disk drive comprising an isolated part in a protection plate, and the isolated part located above a curved area of a flexible cable and an insulation layer disposed between the flexible cable and a lower housing to reduce effect of capacity, so as to reduce interference to signals transmitted in the flexible cable.

An isolated part of a slim optical disk drive of the present invention can include at least one through hole or at least one row of through holes that shields predetermined wires with weak signals. Part of rows of through holes with larger widths shield predetermined wires with stronger signals, and part of rows of through holes with smaller widths shield predetermined wires with weaker signals. Besides, an insulation layer is disposed between a flexible cable and a lower housing, and the insulation layer is disposed on a curved area of the flexible cable. The flexible cable can be a FFC, and the isolated part can be an insulation layer.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the figure(s) being described.

Figure 1:
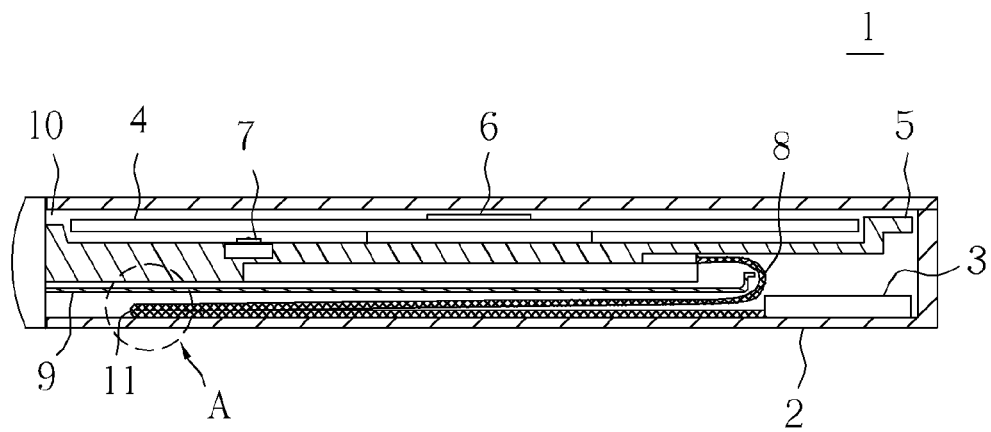
FIG. 1 is a cross-sectional diagram of a conventional slim optical disk drive.
Figure 2:
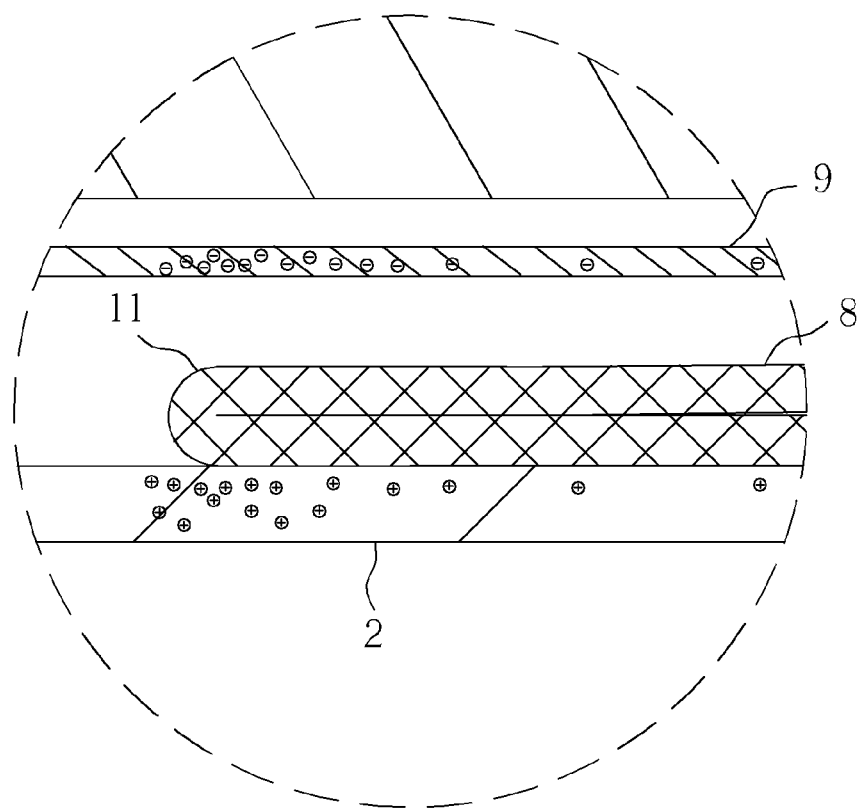
FIG. 2 is a local enlargement diagram of area A as shown in FIG. 1.

Please refer to FIG. 2. FIG. 2 is a partial enlargement diagram of area A as shown in FIG. 1. The noise of signals generated in the flexible cable 8 is analyzed as below. The lower housing 2 and the protection plate 9 are made of metal material. The lower housing 2 and the protection plate 9 get close due to thickness limitation of the slim optical disk drive 1, and currents pass through the flexible cable 8. It's very easy to generate induction which gathers charges of unlike poles on the lower housing 2 and the protection plate 9, so as to generate effect of capacity between the lower housing 2 and the protection plate 9. When induction generated by effect of capacity gets stronger, interference to signals in the flexible cable 8 gets harder, especially for a SATA optical disk drive.

Effect of capacity is strongest in the curved area 11 of the flexible cable 8 due to a hairpin turn of currents and electromagnetic changing extremely in the curved area 11, so as to generate interference to signals in the flexible cable 8 and make the slim optical disk drive 1 unsteady. A FPC is high cost due to precise manufacturing processes, although utilizing a FPC is capable of decreasing stack height to reduce effect of capacity according to configuration requirement of an optical disk drive. Therefore, a FFC is adopted recently in an optical disk drive due to its low cost. However, a FFC is thick and needs to be stacked up in turning directions, so as to easily generate interference to signals in a FFC. Besides, thickness of an optical disk drive gets smaller, and the lower housing 2 and the protection plate 9 get closer, so as to enhance effect of capacity due to squeezing the flexible cable 8.

Figure 3:
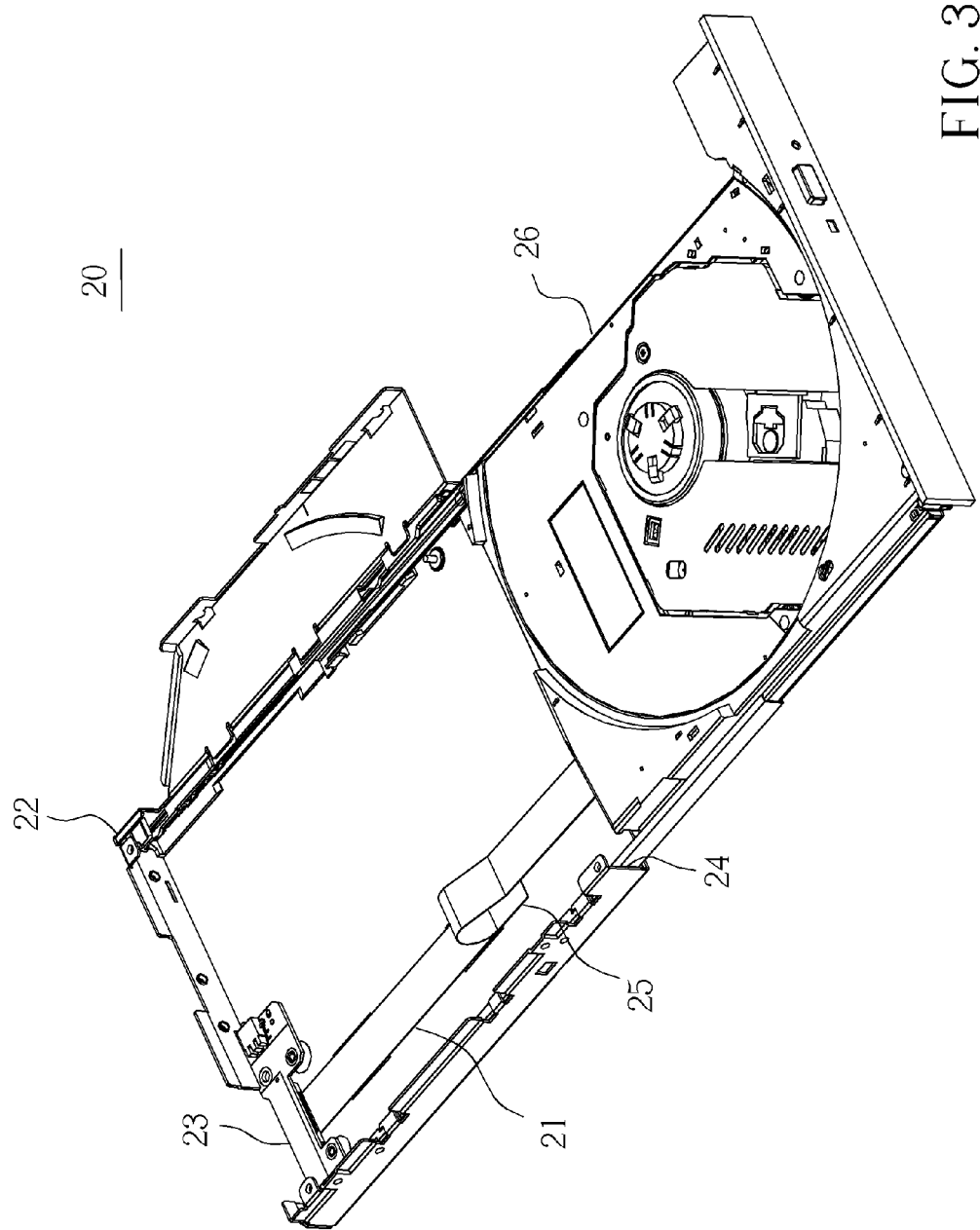
FIG. 3 is a perspective diagram of a slim optical disk drive according to a first embodiment of the present invention.

Please refer to FIG. 3. FIG. 3 is a perspective diagram of a slim optical disk drive 20 according to a first embodiment of the present invention. A FFC is taken for example to describe in the embodiment. The slim optical disk drive 20 comprises a flexible cable 21. An end of the flexible cable 21 is connected to a connector 23 disposed on a rear side of a lower housing 22. The flexible cable 21 extends toward an opening 24 and is stuck on the lower housing 22 made of metal material. A curved area 25 is formed by bending the flexible cable 21 near the opening 24. The other end of the flexible cable 21 is connected to a rear side of a tray 26 in a floating manner. A spindle motor 27 for rotating a disc, an optical pick-up head 28 for reading and writing data on the disc, and other precise components are disposed on the tray 26. The tray 26 is supported by two slide rails for sliding in or sliding out of the opening 24 of the lower housing 22.

Figure 4:
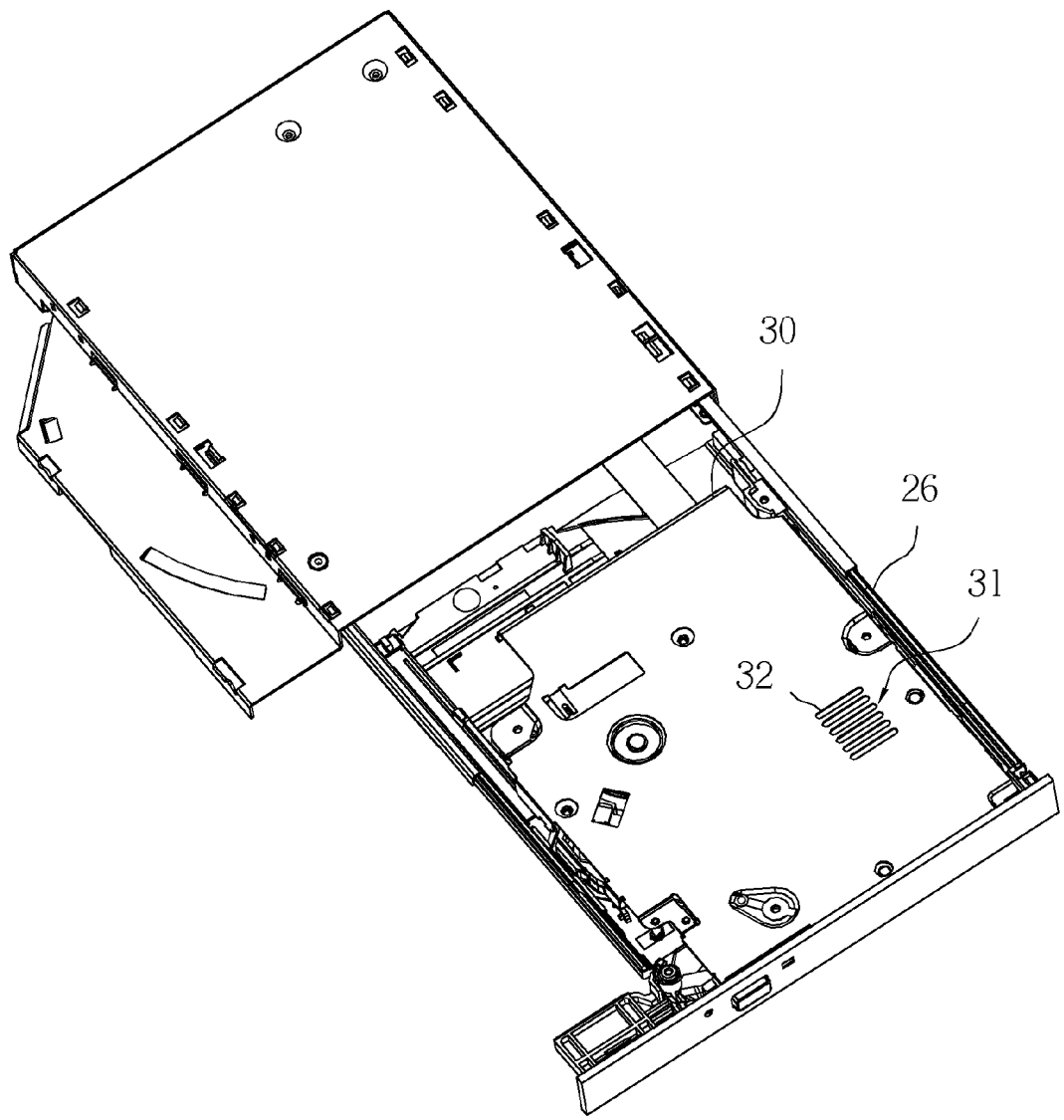
FIG. 4 is a rear perspective diagram of the slim optical disk drive according to the first embodiment of the present invention.
Figure 5:
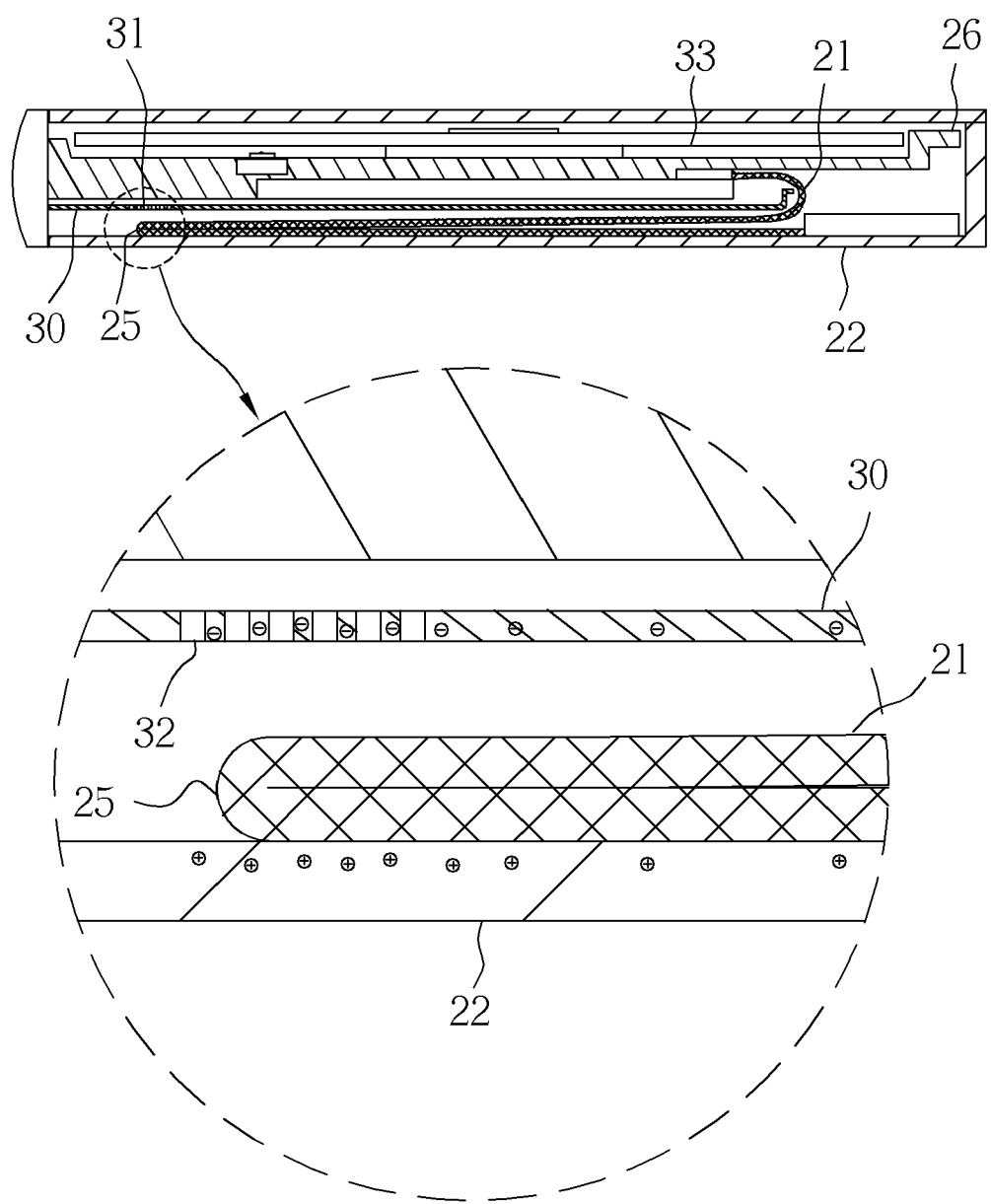
FIG. 5 is a cross-sectional diagram of the slim optical disk drive according to the first embodiment of the present invention.

Please refer to FIG. 4 and FIG. 5. FIG. 4 is a rear perspective diagram of the slim optical disk drive 20 according to the first embodiment of the present invention. FIG. 5 is a cross-sectional diagram of the slim optical disk drive 20 according to the first embodiment of the present invention. A protection plate 30 is utilized to cover a bottom of the tray 26 to protect the precise components on the tray 26. An isolated part 31 is disposed on the protection plate 30. The isolated part 31 is constructed form one row of through holes 32. The flexible cable 21 (the flexible cable 21 is a FFC in this embodiment) is accommodated in a compacted space between the protection plate 30 and the lower housing 22 when the tray 26 is slid inside the lower housing 22 to read or write a disc 33. The isolated part 31 is located above the curved area 25 of the flexible cable 21. The row of through holes 32 of the isolated part 31 can reduce the volume of the protection plate 30 above the curved area 25, so as to reduce the route where charges pass through. Accordingly, charges of unlike poles passing through the lower housing 22 near the curved area 25 is reduced, so as to reduce effect of capacity, such that interference to signals transmitted in the flexible cable is avoided.

Therefore, as for the slim optical disk drive of the first embodiment of the present invention, a plurality of through holes can be formed on the protection plate above the curved area of the flexible cable and the isolated part can be disposed on the flexible cable to reduce effect of capacity between the protection plate and the lower housing, so as to achieve the objective of avoiding interference to signals transmitted in the flexible cable, such that the slim optical disk drive can work steady. Besides, the plurality of through holes of the protection plate can be integrated monolithically when manufacturing the protection plate, and cost of material is not increased in the slim optical disk drive.

Figure 6:
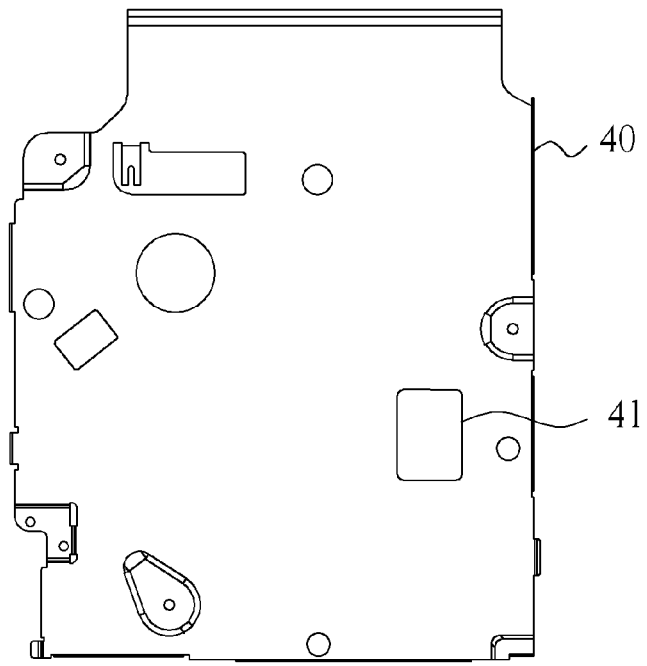
FIG. 6 is a rear diagram of a protection plate of a slim optical disk drive according to a second embodiment of the present invention.

As shown in FIG. 6, FIG. 6 is a rear diagram of a protection plate 40 of a slim optical disk drive according to a second embodiment of the present invention. The basic configuration of the slim optical disk drive of the second embodiment is similar to the first embodiment. The major difference between the first embodiment and the second embodiment is that an isolated part 41 of the protection plate 40 of the second embodiment is a larger through hole. Because interference to signals generated by effect of capacity is occurred on the curved area of the flexible cable, the isolated part is constructed from a plurality of small through holes in the first embodiment to protect the precise components. In the second embodiment, the isolated part 41 as the larger through hole larger than the plurality of small through holes of the first embodiment is formed on the protection plate 40 to cover the curved area of the flexible cable, so as to remove the route where charges pass through, such that interference generated by effect of capacity is completely avoided. As mentioned above, the isolated part 41 can be an insulation layer to replace the larger through hole so as to achieve the objective of avoiding effect of capacity and of protecting the precise components simultaneously.

Figure 7:
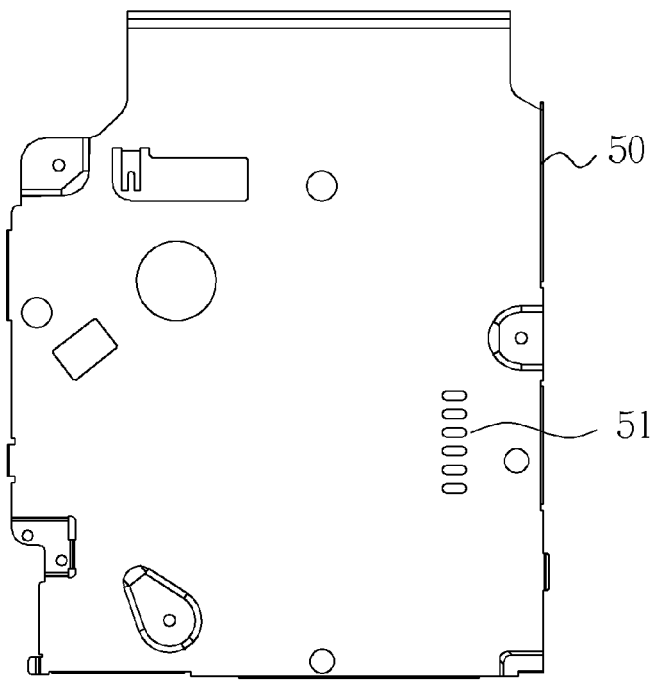
FIG. 7 is a rear diagram of a protection plate of a slim optical disk drive according to a third embodiment of the present invention.

As shown in FIG. 7, FIG. 7 is a rear diagram of a protection plate 50 of a slim optical disk drive according to a third embodiment of the present invention. The basic configuration of the slim optical disk drive of the third embodiment is similar to the first embodiment. The major difference between the first embodiment and the third embodiment is that an isolated part 51 of the protection plate 50 of the third embodiment is a plurality of through holes with smaller widths. The flexible cable comprises a plurality of wires. The intensity of each wire transmitting signals is different. The strong signals in the wire are not influenced by effect of capacity, but the weak signals in the wire are easily influenced by effect of capacity. Therefore, the plurality of through holes of the isolated part 51 is located above the curved area of the flexible cable and shields the predetermined wires with weak signals to reduce effect of capacity. Besides, the function of the protection plate 50 to protect the precise components is kept as well.

Figure 8:
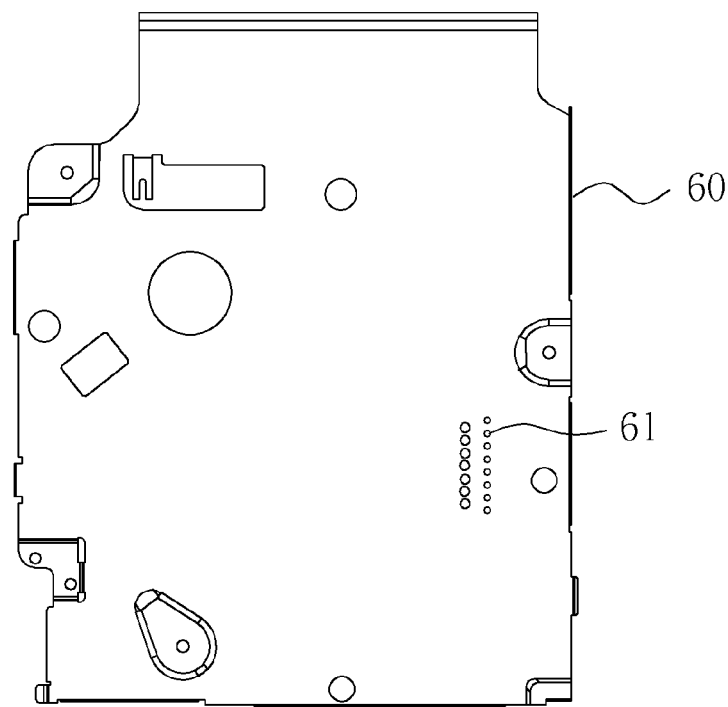
FIG. 8 is a rear diagram of a protection plate of a slim optical disk drive according to a fourth embodiment of the present invention.

As shown in FIG. 8, FIG. 8 is a rear diagram of a protection plate 60 of a slim optical disk drive according to a fourth embodiment of the present invention. The basic configuration of the slim optical disk drive of the fourth embodiment is similar to the first embodiment. The major difference between the first embodiment and the fourth embodiment is that an isolated part 61 of the protection plate 60 of the fourth embodiment comprises two rows of through holes. The amount and disposal of rows of through holes are not limited to this embodiment and depend on actual demand. The row of through holes with larger widths shields the predetermined wires with stronger signals, and the row of through holes with smaller widths shields the predetermined wires with weaker signals. Accordingly, the rows of through holes of the isolated part 61 are capable of reducing effect of capacity, and the function of the protection plate 60 to protect the precise components is kept as well.

Therefore, the slim optical disk drive of the present invention comprises the isolated part. The isolated part is located above the curved area of the flexible cable. The isolated part comprises rows of through holes with different widths or different diameters for shielding the predetermined wires with different signals to reduce effect of capacity, so as to achieve the objective of avoiding interference to signals transmitted in the flexible cable. Besides, the function of the protection plate to protect the precise components is kept as well.

Figure 9:
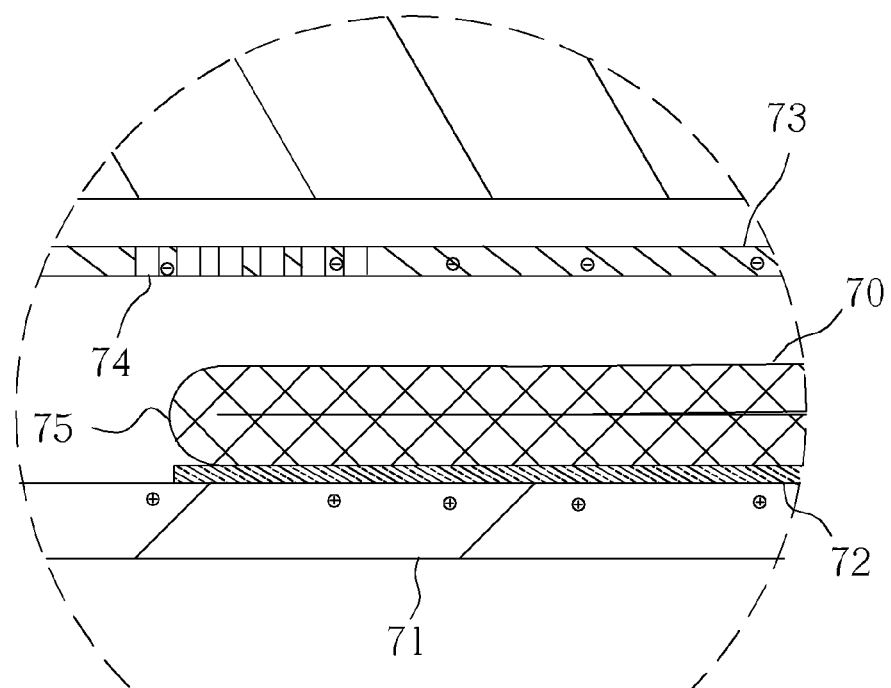
FIG. 9 is a local cross-sectional diagram of a slim optical disk drive according to a fifth embodiment of the present invention.

As shown in FIG. 9, FIG. 9 is a partial cross-sectional diagram of a slim optical disk drive according to a fifth embodiment of the present invention. The basic configuration of the slim optical disk drive of the fifth embodiment is similar to the first embodiment. The major difference between the first embodiment and the fifth embodiment is that an insulation layer 72 is disposed between a flexible cable 70 and a lower housing 71. An isolated part 74 is disposed on a protection plate 73 as the above embodiments. Effect of capacity is reduced between the protect plate and the lower housing due to reducing the route where charges pass through. Furthermore, reduction of the route where charges of unlike poles pass through in the lower housing also can reduce effect of capacity. The flexible cable 70 needs to be stuck on the lower housing 71. The flexible cable 70 will be damaged by a tray if the flexible cable 70 drops off from the lower housing 71, and the data transmission in the flexible cable 70 will be terminated. It is difficult to form a through hole on the lower housing 71 near the flexible cable 70 because a through hole on the lower housing 71 may lead the flexible cable 70 to drop out of the lower housing 71. Accordingly, the insulation layer 72 is disposed between the flexible cable 70 and the lower housing 71. The insulation layer 72 can be also disposed between a curved area of the flexible cable 70 and the lower housing 71. The insulation layer 72 is capable of reducing effect of capacity generated between the lower housing 71 and the protection plate 73, so as to reduce noise of signals.

Therefore, the present invention utilizes the isolated part formed on the protection plate near the curved area of the flexible cable and the insulation layer disposed between the flexible cable and the lower housing to reduce effect of capacity, so as to achieve the objective of reducing interference to signals transmitted in the flexible cable.

Those skilled in the art will readily observe that numerous modifications and alterations of the device and method may be made while retaining the teachings of the invention.

What is claimed is:

1. A slim optical disk drive comprising:
   a lower housing, two slide rails being respectively disposed on two sides of the lower housing, a connector being disposed on a rear side of the lower housing;
   a tray supported by the two slide rails for sliding in or sliding out of an opening of the lower housing;
   a protection plate for covering a bottom of the tray;
   a flexible cable comprising a plurality of wires, an end of the flexible cable being connected to the connector, the flexible cable extending toward the opening and being stuck on the lower housing, a curved area being formed by bending the flexible cable near the opening, the other end of the flexible cable being connected to a rear side of the tray in a floating manner, the flexible cable being accommodated between the protection plate and the lower housing when the tray is slid inside the lower housing to read or write a disc; and
   an isolated part disposed on the protection plate and located above the curved area of the flexible cable, the isolated part comprising rows of through holes with different widths for shielding predetermined wires with weak signals of the plurality of the wires to reduce noise of signals.

2. The slim optical disk drive of claim 1, wherein part of the rows of through holes with larger widths shield the predetermined wires with stronger signals, and part of the rows of through holes with smaller widths shield the predetermined wires with weaker signals.

3. The slim optical disk drive of claim 1, further comprising an insulation layer disposed between the flexible cable and the lower housing.

4. The slim optical disk drive of claim 3, wherein the insulation layer is disposed on the curved area of the flexible cable.

5. The slim optical disk drive of claim 1, wherein the flexible cable is a flexible flat circuit (FFC).

* * * * *